(12) United States Patent
Kulkarni et al.

(10) Patent No.: US 12,625,717 B2
(45) Date of Patent: May 12, 2026

(54) CLIENT-AWARE CONTAINER IMAGE OPTIMIZATION

(71) Applicant: International Business Machines Corporation, Armonk, NY (US)

(72) Inventors: Bhargav P. Kulkarni, Kalaburagi (IN); Harikrishnan Balagopal, Thrissur (IN); Padmanabha Venkatagiri Seshadri, Mysore (IN); Ashok Pon Kumar Sree Prakash, Bangalore (IN); Akash Nayak, Raipur (IN); Mehant Kammakomati, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 18/204,588

(22) Filed: Jun. 1, 2023

(65) Prior Publication Data
US 2024/0403094 A1 Dec. 5, 2024

(51) Int. Cl.
*G06F 9/455* (2018.01)

(52) U.S. Cl.
CPC .................. *G06F 9/45558* (2013.01); *G06F 2009/45583* (2013.01); *G06F 2009/45595* (2013.01)

(58) Field of Classification Search
CPC ....... G06F 9/45558; G06F 2009/45583; G06F 2009/45595
See application file for complete search history.

(56) References Cited

U.S. PATENT DOCUMENTS

| | | | |
|---|---|---|---|
| 10,936,293 B2 | 3/2021 | Varadharajan | |
| 11,099,882 B2 | 8/2021 | Rupprecht et al. | |
| 11,182,193 B2 | 11/2021 | Skourtis et al. | |
| 2018/0039524 A1* | 2/2018 | Dettori .................. | G06F 9/4881 |
| 2018/0275987 A1 | 9/2018 | Vandeputte | |
| 2019/0347121 A1* | 11/2019 | Luo .......................... | G06F 9/542 |
| 2021/0096894 A1* | 4/2021 | Rupprecht ............ | G06F 9/5077 |
| 2022/0164209 A1* | 5/2022 | Yegorin .................... | G06F 8/63 |

(Continued)

OTHER PUBLICATIONS

"Describe format and application of whiteout files #130", https://github.com/opencontainers/image-spec/issues/130#issuecomment-226251109, accessed online May 3, 2023, 4 pages.

(Continued)

*Primary Examiner* — Kenneth Tang
(74) *Attorney, Agent, or Firm* — CHIP LAW GROUP

(57) ABSTRACT
Mechanisms are provided that provide a container image to a client computing device. The mechanisms receive, from a client computing device, a pull request for a requested container image. The pull request comprises a specification of cached container layers that are stored in a local container layer store of the client computing device. The mechanisms determine, based on the specification of the cached container layers, a set of one or more of the cached container layers that can be reused to provide the container image at the client computing device, thereby generating a set of reuse container layers. The mechanisms generate, based on the determination, an output container image comprising only container layers, of the requested container image, that provide files not provided by the set of reuse container layers. The mechanisms transmit the output container image to the client computing device.

20 Claims, 6 Drawing Sheets

(56) References Cited

U.S. PATENT DOCUMENTS

2022/0229647 A1\*  7/2022  Mathews ............ G06F 9/45558

OTHER PUBLICATIONS

"Set cover problem", Wikipedia, accessed online May 3, 2023, 5 pages.

"SlimToolkit", https://github.com/docker-slim/docker-slim, accessed online May 3, 2023, 31 pages.

"Topological sorting", Wikipedia, accessed online May 3, 2023, 8 pages.

"UnionFS", Wikipedia, accessed online May 3, 2023, 4 pages.

Anwar, Ali et al., "Improving Docker Registry Design based on Production Workload Analysis", 16th USENIX Conference on File and Storage Technologies (FAST18), Feb. 12-15, 2018, 8 pages.

Benni, Benjamin et al., "Supporting Micro-services Deployment in a Safer Way: a Static Analysis and Automated Rewriting Approach", Proceedings of the 33rd Annual ACM Symposium on Applied Computing, Apr. 2018, 11 pages.

Fan, Hao et al., "Gear: Enable Efficient Container Storage and Deployment with a New Image Format", ICDCS'21—41st IEEE International Conference on Distributed Computing Systems, Jul. 2021, 12 pages.

Frohlich, Daniel, "Single node OpenShift at the manufacturing edge", Red Hat, Oct. 13, 2021, 8 pages.

Harter, Tyler et al., "Slacker: Fast Distribution with Lazy Docket Containers", 14th USENIX Conference on File and Storage Technologies (FAST'16), Feb. 22-25, 2016, 16 pages.

Li, Sisi et al., "Commutativity-guaranteed Docker Image Reconstruction towards Effective Layer Sharing", WWW '22: Proceedings of the ACM Web Conference 2022, Apr. 2022, 9 pages.

Skourtis, Dimitris et al., "Carving Perfect Layers out of Docker Images", 11th USENIX Workshop on Hot Topics in Cloud Computing (HotCloud 19), Jul. 8, 2019, 8 pages.

Zhao, Nannan et al., "DupHunter: Flexible High-Performance Deduplication for Docker Registries", Proceedings of the 2020 USENIX Annual Technical Conference, Jul. 15-17, 2020, 16 pages.

Zheng, Chao et al., "Wharf: Sharing Docker Images in a Distributed File System", ACM Symposium on Cloud Computing 2018 (SoCC'18), Oct. 11-13, 2018, 12 pages.

\* cited by examiner

100

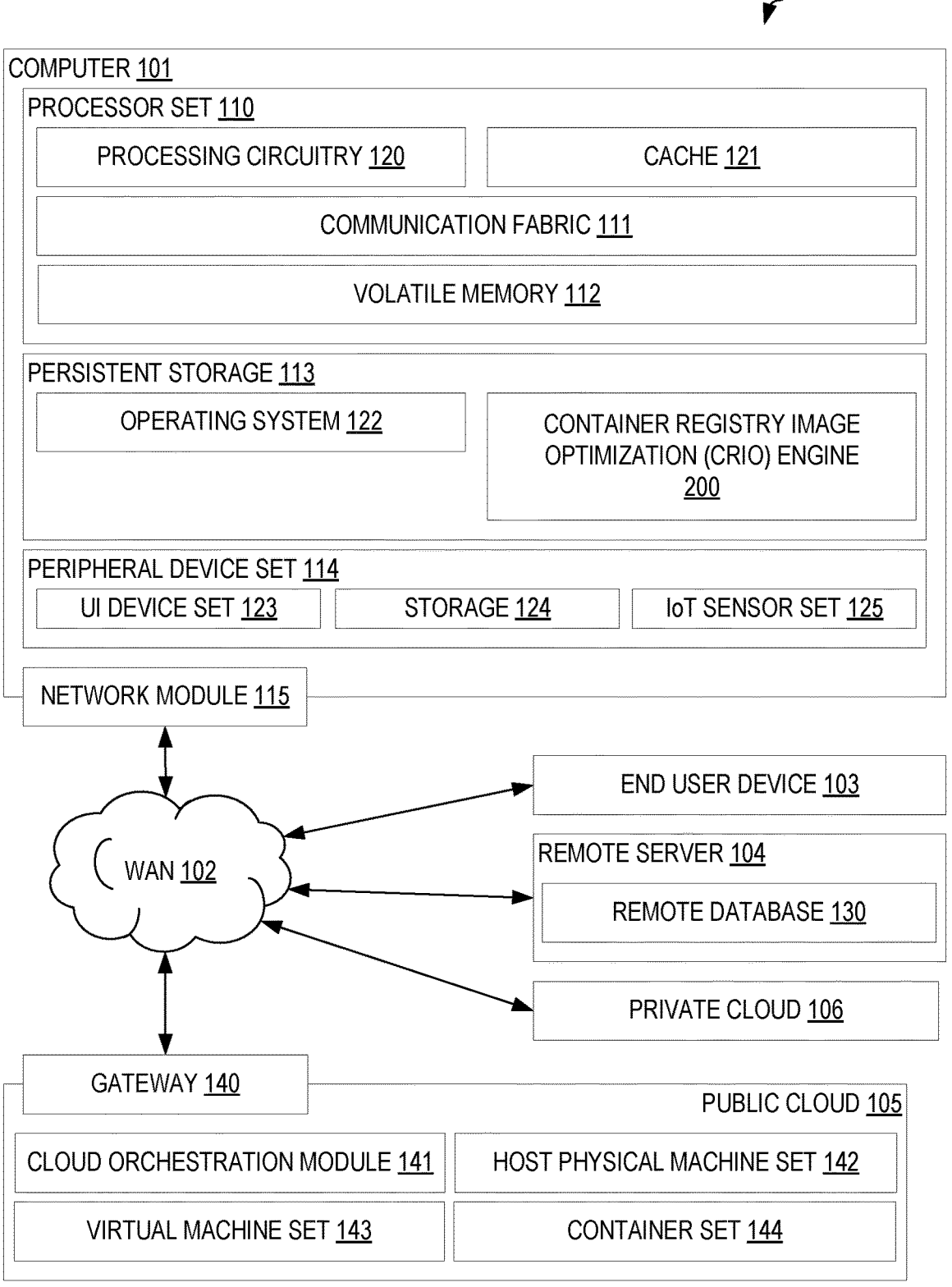

PROCESSOR SET 110

PROCESSING CIRCUITRY 120                CACHE 121

COMMUNICATION FABRIC 111

VOLATILE MEMORY 112

PERSISTENT STORAGE 113

OPERATING SYSTEM 122          CONTAINER REGISTRY IMAGE OPTIMIZATION (CRIO) ENGINE 200

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

*FIG. 1* f1 = {path: p1, hash: h1}    f2 = {path: p2, hash: h2}
f1' = {path: p1, hash: h1'}  f2' = {path: p2, hash: h2'}
f3 = {path: p3, hash: h3}

Layers on client:
L1 = {f1, f2, f3}
L2 = {f1', f2'}

Image to pull is:
Image = [Layer: {f1, f2', f3}]

Solution:
Select layer L1 and create a new layer L3 with just f2'
New Image = [L1: {f1, f2, f3}, L3: {f2'}]

Topological ordering: L2   L3   L4   L1
510

CLIENT-AWARE CONTAINER IMAGE OPTIMIZATION

BACKGROUND

The present application relates generally to an improved data processing apparatus and method, and more specifically to an improved computing tool and improved computing tool operations/functionality for performing client-aware container image optimization.

The cloud-edge is the area of a cloud network architecture where a device or local network interfaces with the cloud computing system. To illustrate the cloud-edge, often persons reference the cloud computing system in terms of levels, where level 0-1 is the user devices, level 2 is line server level, and levels 3 may be a plant data center level, level 4 may be a regional data center level, and level 5 may be a headquarters/cloud data center level. The breakdown of levels is not a fixed architecture, and may have modifications, but essentially the levels give an indication as to how close or how far away from the core computing resources of the cloud computing system that a particular resource is located. For example, levels 0-2 may be considered part of the edge of the cloud computing system, whereas levels 3-5 may be considered to be the core of the cloud computing system.

Virtualization at the edge is increasing with the emergence of single node or lean container orchestration platforms, such as the lightweight Kubernetes distribution K3s, K3d which is a lightweight wrapper to run k3s, single node OpenShift which offers both control and worker node functionality in a single node, and the like.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for providing a container image to a client computing device. The method comprises receiving, from a client computing device, a pull request for a requested container image. The pull request comprises a specification of cached container layers that are stored in a local container layer store of the client computing device. The method further comprises determining, based on the specification of the cached container layers, a set of one or more of the cached container layers that can be reused to provide the container image at the client computing device, thereby generating a set of reuse container layers. The method also comprises generating, based on the determination, an output container image comprising container layers, of the requested container image, that provide files not provided by the set of reuse container layers, wherein the output container image does not include files present in the set of reuse container layers. In addition, the method comprises transmitting the output container image to the client computing device.

In some illustrative embodiments, the output container image comprises fewer layers than a total number of the layers of the requested container image. In this way, the effective number of bytes that must be transmitted to the client computing device to implement the container image at the client computing device is minimized.

In some illustrative embodiments, the output container image comprises new layers of the output container image, different from layers of the requested container image, wherein the new layers comprise files not present in the cached container layers. Thus, the mechanisms of the illustrative embodiments are able to build a modified container image that is transmitted that comprises container layers that may not be present in the stored container image.

In some illustrative embodiments, generating the output container image comprises executing a layer ordering operation on container layers of the output container image to order them according to a hierarchical ordering of the container layers of the output container image. In some illustrative embodiments, this layer ordering operation comprises a topology sorting algorithm applied to a graph representation of the container layers of the output container image. In this way, dependencies between container layers, due to the container layer architecture, may be considered to ensure the correct combination of files are present in the implemented container image at the client computing device.

In some illustrative embodiments, generating the output container image comprises executing a residual correction on the container images of the output container image to add container layers from a container layer repository that have files of the requested container image that are not included in the container layers of the output container image, and are not in the set of reuse container layers, as one or more additional files in the output container image. In this way, files that may be not present in container layers of a container layer repository may be added to the output container image as additional container layers to ensure that all files required for the container image at the client computing device are present.

In some illustrative embodiments, generating the output container image comprises executing a whiteout of files in the output container image to remove files that are not included in the requested container image. As the container image is built using container layers, some container layers may include wanted files in addition to unwanted files and thus, the whiteout operation removes the unwanted files and minimizes the size of the output container image that needs to be transmitted to the client computing device.

In some illustrative embodiments, determining the set of reuse container layers comprises determining a file universe for the container image comprising all of the files included in all of the container layers of the requested container image, and determining a set coverage of files of the cached container layers based on the file universe and the files included in the cached container layers to determine a minimum set of files that are not covered by the cached container layers. In this way, the minimum number of cached container layers needed for reuse may be determined, as well as the minimum number of container layers needed to be transmitted from the container layer repository.

In some illustrative embodiments, determining the set coverage of files comprises: identifying a cached container layer having a maximum number of files in the file universe; adding the cached container layer to the set of reuse container layers; removing files associated with the cached container layer from the file universe to generate an updated file universe; and repeating the identifying, adding, and removing operations based on the updated file universe until no further cached container layer that has associated files in the updated file universe is found. Thus, an iterative process of finding a minimize size of cached container layers and minimum number of container layers and corresponding files needed to implement the container image at the client computing device is determined.

In some illustrative embodiments, determining the set coverage of files comprises: determining, for each cached container layer, a redundancy metric value and a contribution metric value, wherein the redundancy metric value specifies a number of cached container layers, in the set of cached container layers, that contain a rarest file in the cached container layer, and wherein the contribution metric value specifies a number of wanted files in the cached container layer minus a number of unwanted files in the cached container layer; selecting a cached container layer that has a smallest redundancy metric value and largest contribution metric value; removing files associated with the selected cached container layer from the file universe to generate an updated file universe; and repeating the determining, selecting, and removing operations based on the updated file universe until no further cached container layer that has associated files in the updated file universe is selected.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example diagram of a distributed data processing system environment in which aspects of the illustrative embodiments may be implemented and at least some of the computer code involved in performing the inventive methods may be executed;

DETAILED DESCRIPTION

Figure 2:
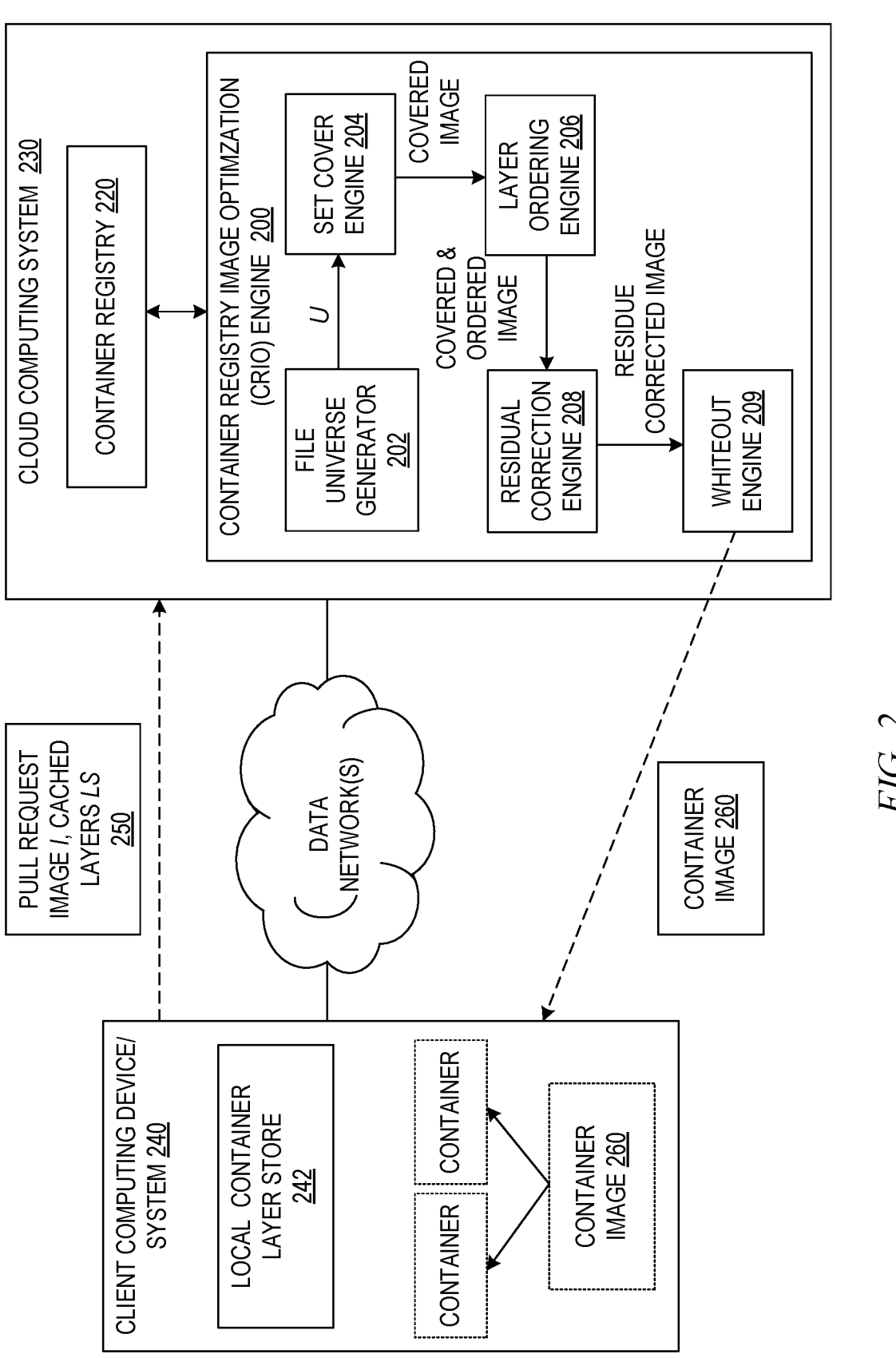
FIG. 2 is an example diagram of the primary operational components of a container registry image optimization engine in accordance with one illustrative embodiment.

While virtualization at the edge is increasing, container images available in public or enterprise registries are not designed for the edge in terms of the container images fitting within the resource constraints (node capacity and network capacity) of edge devices, i.e., container images are very large and require large amounts of processor node capacity, network bandwidth, and other computing resources that may exceed what is available at the edge devices. While efforts have been made to reduce container image size, these methods have significant shortcomings in that they require major changes to existing image distribution protocols and they do not factor in the state of the edge device, e.g., images already present in the device, which could facilitate the reduction in the pull traffic and help operate the container life-cycle under resource constraints, i.e., the management of the container states from creation, deployment, running, stopped, paused, up to being deleted.

It would be beneficial to have an intelligent container registry mechanism that may operate to leverage the layers of containers that are already cached at the client (or requesting) computing device/system when providing container images to these client computing devices/systems and build a container image that reuses the layers of the containers already cached at the client computing device/system (considered a client computing device hereafter). In so doing, the size of the container image transmitted to the client computing device is minimized and the computing resources, e.g., processor, network, and the like, required to implement container images at the client computing device are reduced. The illustrative embodiments provide such an intelligent container registry mechanism that is able to factor into the building of the container image, the client state and provide mechanisms for reconstructing the container image, through greedy heuristics for set-coverage, reordering of layers of the container image using graph modeling, cycle removal, and topological sorting, and altering of the layer composition through whiteout mechanisms. The resulting mechanism reduces the effective number of bytes transmitted to, and received by, the client computing device, while remaining compatible with container lifecycle managers and retaining original image file system composition.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular technological implementation for accomplishing and/or performing the actions, steps, processes, etc., attributable to and/or performed by the engine, but is limited in that the "engine" is implemented in computer technology and its actions, steps, processes, etc. are not performed as mental processes or performed through manual effort, even if the engine may work in conjunction with manual input or may provide output intended for manual or mental consumption. The engine is implemented as one or more of software executing on hardware, dedicated hardware, and/or firmware, or any combination thereof, that is specifically configured to perform the specified functions. The hardware may include, but is not limited to, use of a processor in combination with appropriate software loaded or stored in a machine readable memory and executed by the processor to thereby specifically configure the processor for a specialized purpose that comprises one or more of the functions of one or more embodiments of the present invention. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

It should be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

The present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, of computer program product, it should be appreciated that the illustrative embodiments described herein are specifically directed to an improved computing tool and the methodology implemented by this improved computing tool. In particular, the improved computing tool of the illustrative embodiments specifically provides mechanisms for improving the way that container images are implemented on client computing devices by taking into consideration layers of the containers that may already be cached at the client and able to be reused, as well as providing mechanisms for enabling such reuse in a manner that correctly applies layer ordering of the container image. The improved computing tool implements mechanism and functionality, such as the container registry image optimization engine described herein, which cannot be practically performed by human beings either outside of, or with the assistance of, a technical environment, such as a mental process or the like. The improved computing tool provides a practical application of the methodology at least in that the improved computing tool is able to improve the way in which container images are implemented at client computing devices.

The illustrative embodiments provide an improved computing tool and improved computing tool functionality/operations that is specifically directed to the problem, arising from the computer arts, of specifically the size of container images that need to be transmitted from a container registry to client computing devices. As this size has increased dramatically, and container image utilization is increasing with the increasing implementation of virtualization at the edge of cloud computing systems, especially due to the emergence of single node or lean container orchestration platforms, the size of container images is increasingly an issue. The illustrative embodiments address the increasing size of the container images by providing an intelligent container registry mechanism that generates container images for transmission to client computing device, which implements layer reuse at the client computing device and thereby minimizes the size of the container image that must be transmitted from the container registry to the client computing device.

In order to better understand the mechanisms of the illustrative embodiments as will be described hereafter, it is beneficial to have an understanding of some underlying concepts. In particular it is beneficial to have an understanding of containers, container registries, copy-on-write and union file systems, container image layer architecture, set cover problems, and topological sorting.

Containers are executable units of software in which application code is packaged along with its libraries and dependencies, in common ways so that the code can be run anywhere, whether it be on a desktop, traditional information technology systems, or in cloud computing systems. To do this, containers take advantage of a form of operating system (OS) virtualization in which features of the OS kernel (e.g., Linux namespaces and cgroups, Windows silos and job objects, etc.) can be leveraged to isolate processes and control the amount of CPU, memory and disk that those processes can access. A container is an instance of a container image, where the container image is the "blueprint" or "map" of a container environment including system libraries, system tools, and other platform settings that an application needs to run. Multiple containers may be run from the same container image and each container will have the same software and configuration as specified in the container image. Examples of containers include Docker containers, but the illustrative embodiments are not limited to such.

Containers carry all their dependencies with them, meaning that software can be written once and then run without needing to be re-configured across laptops, cloud and on-premises computing environments. Due to a combination of their deployment portability/consistency across platforms, containers are an ideal fit for modern development and application patterns, such as DevOps and microservices, that are built using regular code deployments in small increments. Like virtual machines before them, containers enable developers and operators to improve CPU and memory utilization of physical machines. Where containers go even further is that because they also enable microservices architecture, application components can be deployed and scaled more granularly, which is an attractive alternative to having to scale up an entire monolithic application because a single component is struggling with its load.

A container registry is a repository, or set of repositories, of container images. A container registry operates as a place for developers to store container images and share them via a process of uploading (pushing) to the container registry and downloading (pulling) into another computing system. Once a computing system pulls the container image, the application within the container image may be run on that computing system. In addition to container images, container registries also store application programming interface (API) paths and access control parameters for container-to-container communication.

Container image layer architecture refers to the fact that containers are essentially a base container image and a combination of one or more layers representing changes to the base container image to generate a specific container image. That is, when one generates a container image, one may use image layers, where each image layer includes the system libraries, dependencies, and files needed for the container environment, where these image layers may be self-contained units of container image development and can be reused for different containers. The base container image layer, also referred to as a parent layer, provides a basis for building the additional image layers that include the additional software or specific configurations required for a specific container image. The base or parent layer may be a pre-configured image that provides a basic functionality, such as a stripped-down operating system, a content management system, a database system, or the like.

A copy-on-write and union file system is a file system that supports both copy-on-write (COW) operations, and UnionFS which is a filesystem service that implements union mount of other file systems, allowing files and directories of separate file systems to be transparently overlaid to form a single coherent filesystem, where contents of directories which have a same path within the merged branches will be seen together in a single merged directory. COW, also referred to as implicit sharing or shadowing is a resource-management technique used in computer programming to efficiently implement a duplicate or copy operation on modifiable resources. If a resource is duplicated but not modified, it is not necessary to create a new resource; the resource can be shared between the copy and the original. However, modifications must still create a copy, hence the COW technique where the copy operation is deferred until the first write. By sharing resources in this way, it is possible to significantly reduce the resource consumption of unmodified copies, while adding a small overhead to resource-modifying operations.

The set cover problem is a classical question in combinatorics, computer science, operations research, and complexity theory. Given a set of elements $\{1, 2, \ldots, n\}$ (referred to as the "universe") and a collection S of m sets whose union equals the universe, the set cover problem is to identify the smallest sub-collection of S whose union equals the universe. For example, consider the universe U={1, 2, 3, 4, 5} and the collection of sets S={{1, 2, 3}, {2, 4}, {3, 4}, {4, 5}}. Clearly the union of S is U. However, all of the elements may be covered with the following, smaller number of sets: {{1, 2, 3}, {4, 5}}. Thus, the set cover problem seeks to find the minimum number of sets needed to cover the universe.

Topological sorting is an algorithm applied to directed graph data structures, where the topological sorting algorithm returns an array of nodes of the directed graph where each node appears, in the array, before all the nodes it points to. Topological sorting is generally known in the art and thus, a more detailed explanation is not provided herein.

The above underlying concepts are implemented in the mechanisms of one or more of the illustrative embodiments as will be described hereafter with regard to the example methodologies for generating a container image leveraging layer reuse at the client computing device. Initially, example computing system implementations and primary operational components of a container registry image optimization engine will be described. Thereafter, example methodologies will be described, which are implemented by one or more of the illustrative embodiments by the example computing system and container registry image optimization engine.

FIG. 1 is an example diagram of a distributed data processing system environment in which aspects of the illustrative embodiments may be implemented and at least some of the computer code involved in performing the inventive methods may be executed. That is, computing environment 100 contains an example of an environment for the execution of at least some of the computer code involved in performing the inventive methods, such as the container registry image optimization engine 200 in FIG. 2, discussed hereafter. In addition to block XZ00, computing environment 200 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As shown in FIG. 1, one or more of the computing devices, e.g., computer 101 or remote server 104, may be specifically configured to implement a container registry image optimization engine 200. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as computing device 101 or remote server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates client-aware container image optimization.

FIG. 2 is an example diagram of the primary operational components of a container registry image optimization engine in accordance with one illustrative embodiment. The operational components shown in FIG. 2 may be implemented as dedicated computer hardware components, computer software executing on computer hardware which is then configured to perform the specific computer operations attributed to that component, or any combination of dedicated computer hardware and computer software configured computer hardware. It should be appreciated that these operational components perform the attributed operations automatically, without human intervention, even though inputs may be provided by human beings, e.g., search queries, and the resulting output may aid human beings. The invention is specifically directed to the automatically operating computer components directed to improving the way that container images are implemented on client computing devices by taking into consideration layers of the containers that may already be cached at the client and able to be reused, as well as providing mechanisms for enabling such reuse in a manner that correctly applies layer ordering of the container image. The invention provides a specific solution that cannot be practically performed by human beings as a mental process and is not directed to organizing any human activity.

As shown in FIG. 2, a container registry image optimization engine 200 may be provided as part of a container registry 220 of a cloud computing system 230 comprising one or more computing systems, such as the computing system in FIG. 1, for example. Client computing devices/systems, such as client device 240 may send requests 250 to request container images from the container registry 220 and be provided container images 260 in response. The container images 260 that are returned are based on a determination of which container layers are already cached at the client computing device in a local container layer store 242, and comprise only the layers not already cached at the client computing device. The container registry 220 implements the container registry optimization engine 200 of one or more illustrative embodiments, to determine a minimum number of layers of the requested container image that need to be included in the container image 260 that is returned, and performs operations to apply layer ordering, residual correction, and whiteout undesirable layers to generate the resulting container image 260.

As shown in FIG. 2, the request sent from the client device 240 includes a specification of the container image I that is being requested and an identification of the set of container layers Ls that are cached in the local container layer store 242. The client device 240 fetches all of the container layers Ls from the container registry and thus, by maintaining a history of the container pulls, the set of container layers Ls is able to be determined. The set of container layers Ls that are cached in the local container layer store 242 may be container layers cached from previous container image pulls from the container registry 220.

The container registry 220 comprises logic to invoke the container registry image optimization engine 200. The container registry image optimization (CRIO) engine 200 comprises a file universe generator 202, a set cover engine 204, a layer ordering engine 206, a residual correction engine 208, and whiteout engine 209. The file universe generator 202 comprises logic that operates, based on the specification of the container image I that is requested, a universe of the files that are included in the requested container image I. The image I is already in the container registry 220 and thus, when the client device 240 requests the image I, which may be stored as an archive, by placing a pull request, the universe of files of that image I in the container registry may be determined from the archive. The files that are included in the requested container image I represent the universe U for purposes of performing a set cover problem solution by the set cover engine 204. As described in greater detail hereafter, various methodologies may be followed by the set cover engine 204 logic to perform this set cover problem solution. The set cover engine 204 determines which files in the cached container layers Ls in the local container layer store 242 of the client computing device 240 may be reused to provide the requested container image on the client computing device 240. Thus, the set cover engine 204 determines a covered image which indicates which container layers (and their files) may be reused from the local container layer store 242, and which container layers (and their files) need to be transmitted from the container registry 220 to the client device 240.

The layer ordering engine 206 comprises logic that operates to order the layers of the covered image to thereby generate a covered and ordered image. That is, in the container layered architecture, where layers are built upon previous layers and change/override elements of the previous layers in the hierarchy, the order in which layers are placed and which layers are selected impact the final file system view of the container image. For example, layers L1 and L2 could have a file with the same path but different content, resulting in different hashes. If layer L1 is placed above L2 in the container image building process, then the file in L2 is masked due to the properties of a union file system, and vice versa should L2 be above layer L1 in the container image. Hence, it is important to determine which file content is required in the final container image and accordingly order the container layers. To ensure this, the layer ordering engine 206 employs a topology sorting based algorithm to order the container layers of the covered image and thereby generates the covered and ordered image.

The covered and ordered image is provided to the residual correction engine 208 which operates to add residual files that are not covered by the container layers chosen to be part of the covered and ordered image. That is, if the entire universe U of files needed for the requested container image are not in the cached layers Ls at the local container image store 242, then the files not included in Ls must be provided by the container registry 220. These files are the residual files that may be included in container layers stored in the container registry 220 and added to the container image, such as in the form of new container layers. This will complete the transformed image I' such that it contains all the files that were originally in the requested container image I. The transformed image I' may have unwanted files which need to be removed, as a consequence of this process, since files are added in terms of container layers. Hence, the whiteout engine 209 operates to remove the unwanted files from the container image 260 that is output to the client computing device 240. This container image 260 contains the files of the container image that are not already present in the cached container layers in the local container layer store 242 of the client computing device 240 which will be reused to provide the container image on the client computing device 240. The container image 260 may include new layers that are a product of the mechanisms of the illustrative embodiments, which are layers produced by reshaping the original container image I layers to factor in the contents of the cached files at the client device 220.

Thus, the container image 260 has a smaller overall size than the container image that would otherwise need to be without the implementation of the illustrative embodiments, i.e., less than all of the files of all of the container layers for the container image. That is, the container image 260 is smaller by the amount of files of container layers that are already in the local container layer store 242, and which will be reused at the client computing device 240 to provide the containers based on the container image. This results in a resource savings with regard to network resources, processing resources, storage resources, and the like.

As mentioned above, after the file universe generator 202 determines the universe U of the files needed for the requested container image I, the set cover engine 204 determines which files in the cached container layers Ls in the local container layer store 242 of the client computing device 240 may be reused to provide the requested container image on the client computing device 240. Since containers are built using the layered architecture described previously, files are provided as groups of files, e.g., each layer has a group of files that define that layer, where each group of files may be considered a set in a set cover problem. Thus, the determination of which cached container layers Ls can be reused is a set cover problem that may be solved in a number of different ways. The present description will set forth two methodologies that may be used to solve this set cover problem, but other methodologies may be used without departing from the spirit and scope of the present invention.

Figure 3:
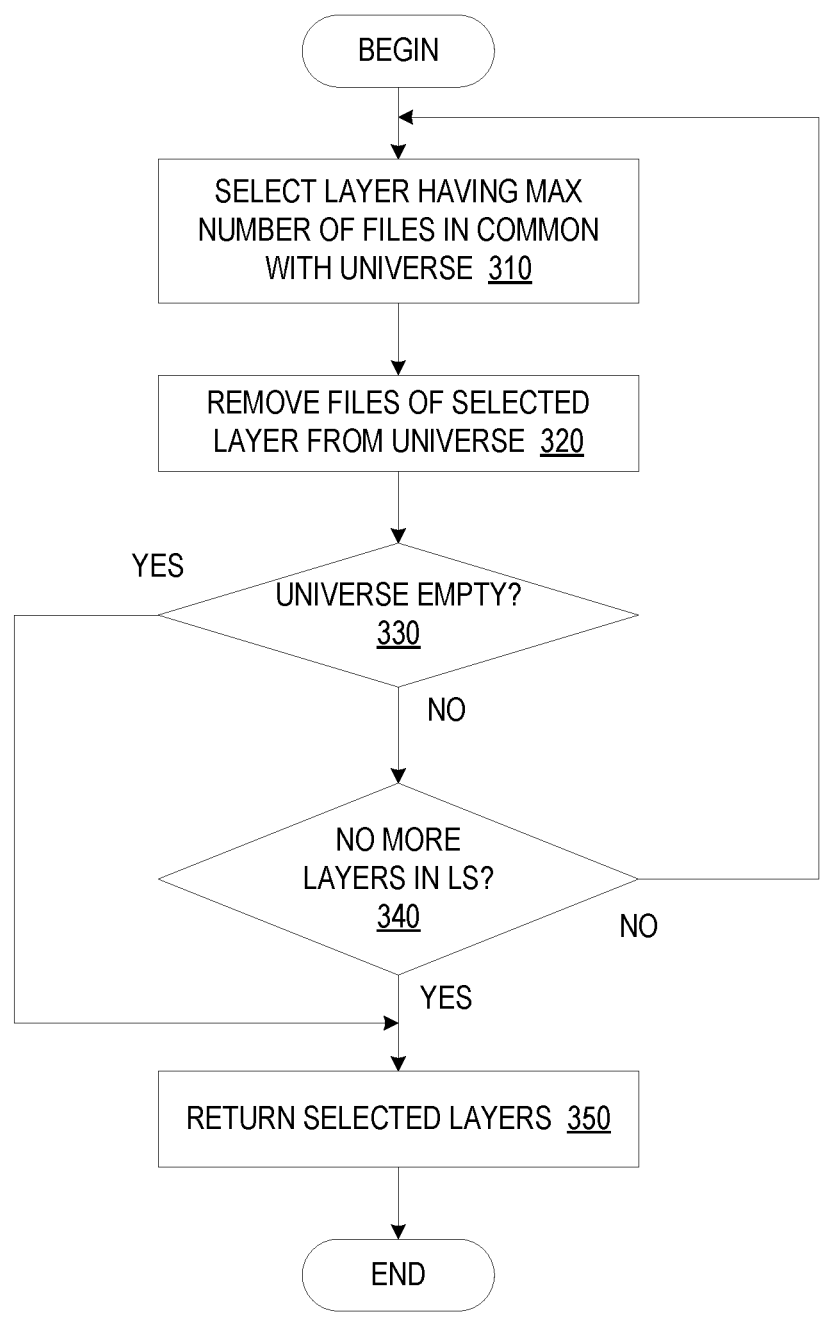
FIG. 3 is an example diagram illustrating a first methodology for applying set cover on a universe in accordance with one illustrative embodiment.

FIG. 3 is an example diagram illustrating a first methodology for applying set cover on a universe in accordance with one illustrative embodiment. As shown in FIG. 3, with the first methodology, at each step of the method, from the cached layers Ls at the client computing device, which were reported in the request for the container image, the cached layer which contains the maximum number of wanted files is selected, and those files are removed from the universe U. The methodology continues to do so and stops once there are no more layers in the cached layers Ls to select or if all the files in the universe U have been covered. It should be appreciated that in performing this methodology, some unwanted files will be included, as again the files are in groups or sets of files associated with each layer and thus, a set may be selected because it has a file needed for the container image, but that set may also have files that are not needed for the container image.

Thus, with reference again to FIG. 3, in a first step of the operation, a layer which has a maximum number of files in common with the universe U is selected from the cached layers Ls (step 310). The files in that selected layer are then removed from the universe U, as they are already covered by the selected layer (step 320). A determination is made as to whether the universe U is empty (step 330). If not, a determination is made as to whether there are no more layers in Ls that have not been selected (step 340). If either of the determinations in steps 330 or 340 are affirmative, i.e., the universe U is empty or there are no more selectable layers in Ls, then all selected layers are then returned as the layers in Ls that may be reused at the client computing device and thus, do not need to be included in the container image transmitted from the container registry to the client computing device (step 350). The operation then terminates.

To illustrate this further consider an example in which the universe U of files is determined to be the set of files {1, 2, 3, 4, 5, 6} and that the cached layers in the client computing device are as follows: L1={2, 3, 4, 5, 6, 7, 8}; L2={1, 2, 3}; and L3={4, 5, 6}. Through operation of this first methodology, the layer L1 would be selected initially as it has the maximum overlap with the files in the Universe, i.e., files 2, 3, 4, 5, and 6, but also includes files 7 and 8 which are not needed. The files 2, 3, 4, 5, and 6 would be removed from the universe U which leaves only file 1 left to be covered. Layer L2 would then be selected as having the maximum overlap with the updated universe U', i.e., file 1, and would also provide files 2 and 3 as well. File 1 would be removed from the universe U' leaving an empty universe so that the methodology would stop and the layers L1 and L2 would be returned as the layers that are in the cached layers Ls of the client computing device and which may be reused. It should be appreciated that while this provides a solution to the set cover problem, it is not an optimal solution as the solution includes unwanted files 7 and 8. A better solution would be layers L2 and L3 which also covers all the files needed, but the way in which the methodology operates causes L1 to be selected first.

Figure 4:
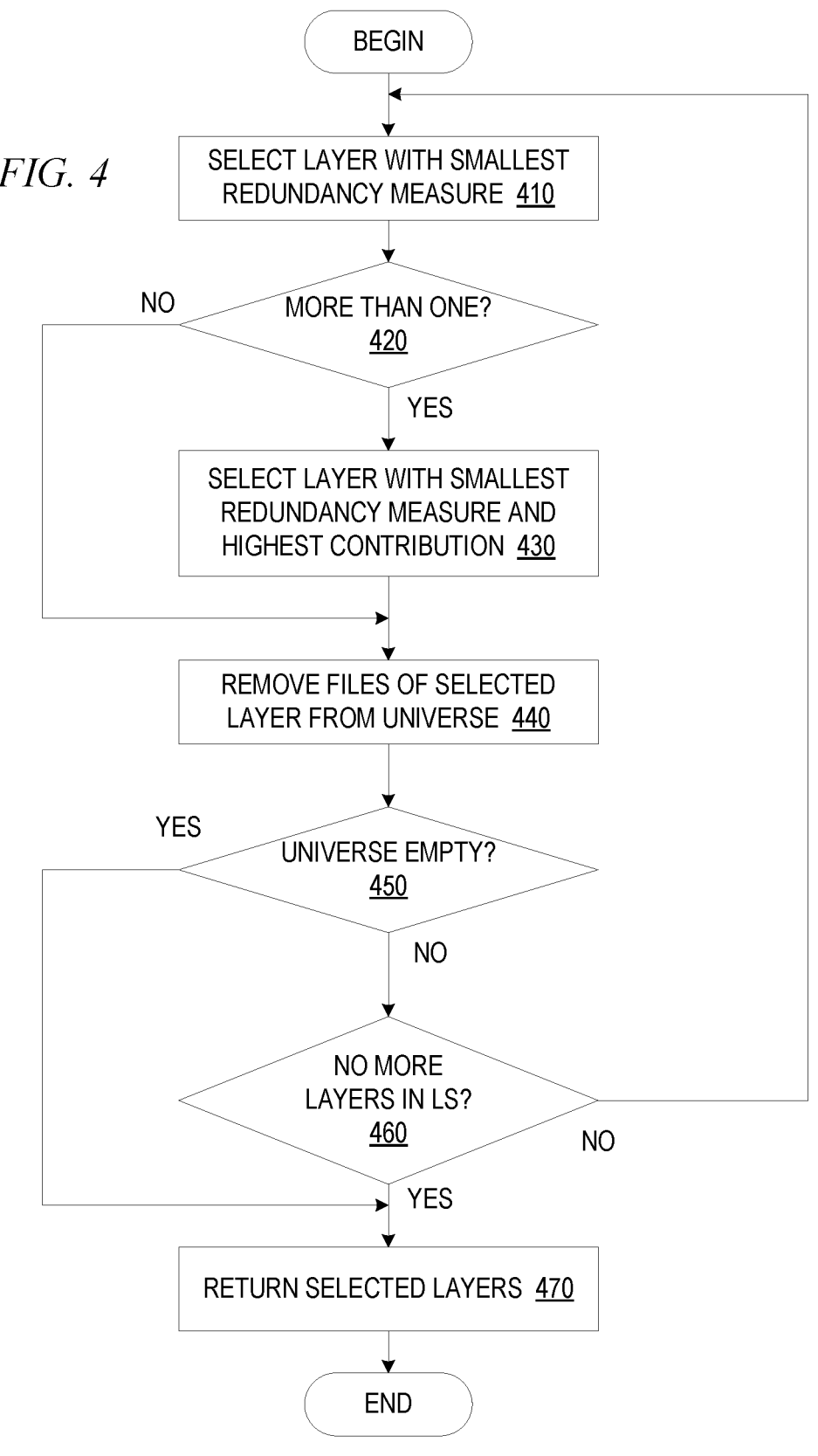
FIG. 4 is an example diagram illustrating a second methodology for applying set cover on a universe in accordance with one illustrative embodiment.

FIG. 4 is an example diagram illustrating a second methodology for applying set cover on a universe in accordance with one illustrative embodiment. The second methodology addresses the sub-optimal solutions that may occur using the first methodology, but it should be appreciated that either methodology provides a valid solution to the set cover problem of the cached files and the universe of files required by the container image. The second methodology is more complex than the first methodology and thus, these different methodologies may be more or less suited to a particular implementation based on the individual situations.

As shown in FIG. 4, in the second methodology, two metrics are considered for each of the layers L in Ls: Redundancy and Contribution. Redundancy for a layer L is a measure that specifies the number of layers in Ls that contain the rarest file in the layer L. Contribution for a layer L is a measure of the number of wanted files in L, less the number of unwanted files in L. Thus, Redundancy specifies how redundant the files of a layer are in the set of cached layers Ls and Contribution specifies how much of a contribution the layer L provides to completing the universe U of files needed for the container image.

With the methodology of FIG. 4, the Redundancy and Contribution metrics of the layers are used to select the layers that have the smallest redundancy and highest contribution, rather than just the maximum commonality with the universe U. This reduces the number of unwanted files in the final result.

Thus, as shown in FIG. 4, in a first step of the operation, a layer L is selected from the cached layers Ls, where L is the layer with the smallest Redundancy measure (step 410). A determination is made as to whether there is more than one layer in Ls that has the same smallest Redundancy measure (step 420). If there are, then the layer L of those with the smallest Redundancy measure, that also has the highest Contribution measure, is selected (step 430). Thereafter, similar to the methodology in FIG. 3, the files in that selected layer are then removed from the universe U, as they are already covered by the selected layer (step 440). A determination is made as to whether the universe U is empty (step 450). If not, a determination is made as to whether there are no more layers in Ls that have not been selected (step 460). If either of the determinations in steps 450 or 460 are affirmative, i.e., the universe U is empty or there are no more selectable layers in Ls, then all selected layers are then returned as the layers in Ls that may be reused at the client computing device and thus, do not need to be included in the container image transmitted from the container registry to the client computing device (step 470). The operation then terminates.

To illustrate the operation of this methodology further, again consider the example discussed above with regard to FIG. 3, i.e., consider an example in which the universe U of files is determined to be the set of files {1, 2, 3, 4, 5, 6} and that the cached layers in the client computing device are as follows: L1={2, 3, 4, 5, 6, 7, 8}; L2={1, 2, 3}; and L3={4, 5, 6}. The algorithm will go through a number of iterations to build the set of cached layers that provide files for the requested container image I. In a first iteration, the layer L1 has a Redundancy of 2 (files 7 and 8 are the rarest files as they appear in only 1 layer, so the Redundancy is 1 (file 7)+1 (file 8)=2) and a Contribution of 3 (5 files in U−2 layers not in U). Similarly, layer L2 has a Redundancy of 1 and a Contribution of 3 and layer L3 has a Redundancy of 2 and a Contribution of 3. From this, layer L2 would first be selected as it has the smallest Redundancy, i.e., 1. The files of L2 would then be removed from the universe U, resulting in an updated universe U' of {4, 5, 6}.

In a second iteration, layer L1 has a Redundancy of 2 and a Contribution of 1 (3 files in U'−2 layers not in U'). Layer L3 has a Redundancy of 2 and a Contribution of 3 (3−0=3). Note that the Redundancy and Contribution measures must be calculated each iteration since these measures may change from one iteration to the next. As a result, layer L3 is selected as it has the smallest Redundancy and the highest Contribution of the layers with the same smallest Redundancy measure. The files of layer L3 are then removed from the universe U' which leaves an empty universe so that the methodology would stop and the layers L2 and L3 would be returned as the layers that are in the cached layers Ls of the client computing device and which may be reused. Notably, this solution does not result in any unwanted files.

It should be appreciated that while in this example no unwanted files are present in the final solution of L2 and L3, in some cases there may still be some unwanted files present in the solution to the set cover problem. Moreover, the issues of ordering of the layers, files that need to be included in the container image but which are not covered by the solution to the set cover problem, and the removal of unwanted files still need to be addressed. Thus, as mentioned previously, a layer ordering engine 206, residual correction engine 208, and whiteout engine 209 are provided. With the layer ordering performed by the layer ordering engine 206, as noted previously, when selecting and constructing layers, the order in which layers are placed and which layers are selected impacts the final file system view of the container image. For instance, layers L1 and L2 could have a file with the same path but different content (resulting in different hashes). If L1 is placed above L2 in the container image layer hierarchy, then the file in L2 is masked due to the properties of the union file system, for example. To ensure proper ordering of layers to achieve the desired container image view by the file system, the layer ordering engine 206 implements a topology sorting methodology, such as that shown in FIGS. 5A and 5B.

Figures 5A, 5B:
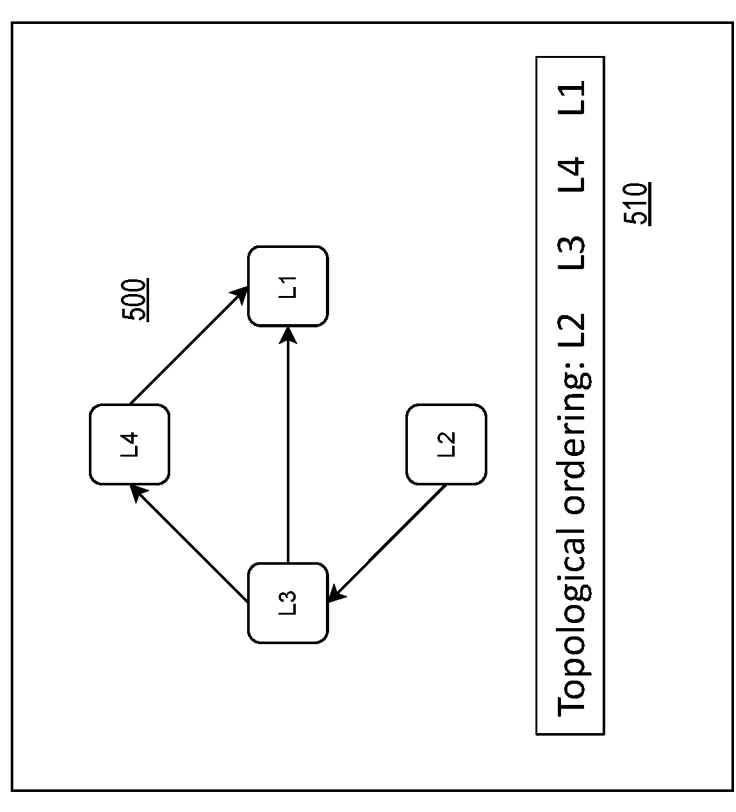
FIG. 5A is an example diagram showing an example graph with a loop that is to be removed and represented as an iteration value for the loop in accordance with one illustrative embodiment.
FIG. 5B is an example diagram illustrating container layer dependency or graph upon which a topological sorting of the graph is performed to identify a correct hierarchy of container layers in accordance with one illustrative embodiment.

FIG. 5A is an example diagram showing an example graph with a loop that is to be removed and represented as an iteration value for the loop in accordance with one illustrative embodiment. FIG. 5B is an example diagram illustrating container layer dependency or graph upon which a topological sorting of the graph is performed to identify a correct hierarchy of container layers in accordance with one illustrative embodiment. With the mechanisms of the illustrative embodiments, the layer ordering engine 206 constructs a directed graph G with layers as vertices and edges existing between layers if, and only if, both layers connected by the edge have a file with the same path, different content (hashes) and the file is a required file for the container image, e.g., an edge exists between L1 and L2 if L1 and L2 both have a required file with the same path but different hashes. As shown in FIG. 5A, cycles in the graph are excluded so as to converge the graph G into a directed acyclic graph (DAG). Thus, for example, if a layer L1 has an edge to layer L2, and layer L2 has an edge to layer L1, such a cycle is eliminated from the graph G to thereby make the graph a DAG upon which topological sorting is performed. As noted previously, the topological sorting applies an algorithm that traverses the DAG and returns an array of nodes, where each node appears, in the array, before all the nodes it points to, thereby providing a topological sort or ordering of the nodes in the graph. The resulting array indicates the order in which layers (represented by nodes in the graph) should be used in the construction of the layers in the container image.

To further illustrate the removal of cycles from a graph G, consider an example in which there are a plurality of files f1, f1', f2, f2', and f3 having the corresponding paths and hash values as shown in FIGS. 5A and 5B. In this example, f1' is a different version of the file f1 having the same path, but different contents (and thus, a different hash). The same is true of f2' with regard to file f2. Now assume that the client has cashed in their local container layer store the layers L1 and L2, where layer L1 has files {f1, f2, f3} and layer L2 has files {f1', f2'}. Now, assume that the container image I that is to be pulled from the container registry comprises files {f1, f2', f3}, i.e., Image=[Layer:{f1, f2', f3}].

In this example, using the graph construction discussed above, layer L1 would have an edge to layer L2, and vice versa, as both layers have a file f2 and f2', which is a required file (f2' is a file in the layer of the requested container image) that have a same path (p2), and the files have different hashes. The same is true of files f1 and f1' with f1 being a required file of the container image. In order to remove the cycle in the graph, a layer having the maximum coverage of required files is selected, and one or more additional layers, e.g., L3 in this example, are created to provide the additional files, as long as the one or more additional layers do not result in additional cycles. In this case, a new layer L3 is created that has only file f2' as it is the only file that is not covered by layer L1 which has the maximum coverage of the files in the container image, e.g., L1 has files f1 and f3 whereas layer L2 only has file f2'. Thus, the new container image is I'=[L1: (f1, f2, f3), L3: (f2')] it is determined that layer L1 is to be selected and a new layer L3 is to be created that has only the file f2'.

Having removed any cycles from the graph G, the corresponding DAG may be constructed and processed by way of a topological sort methodology to generate the array specifying the ordering of the layers in the container image. FIG. 5B illustrates an example DAG (not the same example as in FIG. 5A), in which container layers and their dependencies are represented. The DAG takes into consideration any layers generated as part of the cycle removal operation, e.g., layer L3 in this example. An example DAG 500 is shown in FIG. 5B with its corresponding topological ordering 510 obtained by applying a topological sorting algorithm to the depicted DAG. In this case, the ordering would be {L2, L3, L4, L1}, where L2 is a base layer, and layer L3 is built on base layer L2, followed by layer L4 built on the combination of the base layer L2 and intermediate layer L3, and so on.

Thus, through the operations of FIGS. 3-5B, an ordered set of container layers that can be reused from the local container layer store of the client computing device is obtained, but these layers may not have all of the files that are required by the container image I. Any files that are determined to be needed in the container image I, but which are not in the cached container layers at the client computing device, are identified by the residual correction engine 208 to thereby generate a transformed container image I' that contains container layers that provide the files that are not covered by the cached container layers at the client computing device. This may result in some additional unwanted files being present, from the layers providing the files that are not covered by the cached container layers, which are then removed by the whiteout engine 209. That is, the white engine 209 identifies unwanted files in the transformed container image I' which need to be removed, and removes them using whiteout files. For example, files that are to be removed when a changeset is applied are designated by a prefix ".wh." being added to the file's base name.

Figure 6:
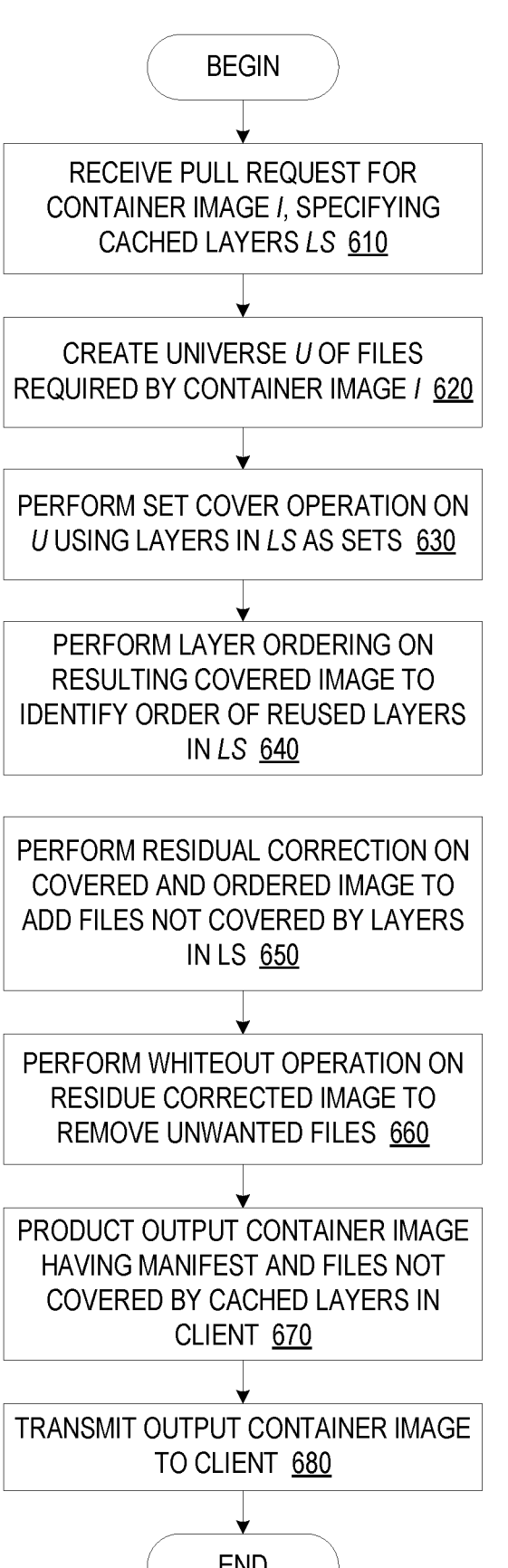
FIG. 6 is a flowchart outlining an example operation for client-aware container image optimization in accordance with one illustrative embodiment.

FIG. 6 presents a flowchart outlining example operations of elements of the present invention with regard to one or more illustrative embodiments. It should be appreciated that the operations outlined in FIG. 6 are specifically performed automatically by an improved computer tool of the illustrative embodiments and are not intended to be, and cannot practically be, performed by human beings either as mental processes or by organizing human activity. To the contrary, while human beings may, in some cases, initiate the performance of the operations set forth in FIG. 6, and may, in some cases, make use of the results generated as a consequence of the operations set forth in FIG. 6, the operations in FIG. 6 themselves are specifically performed by the improved computing tool in an automated manner.

FIG. 6 is a flowchart outlining an example operation for client-aware container image optimization in accordance with one illustrative embodiment. As shown in FIG. 6, the operation starts by receiving a pull request for a container image, where the pull request specifies the container image I and the container layers that are already cached in the client's local container layer store Ls (step 610). A universe U of files required for the container image I is created (step 620). A set cover operation is performed on the universe U using the layers in Ls as the sets to identify the layers in Ls that can be reused (step 630). This results in a covered image that is the basis for performing a layer ordering operation to identify the order of the reused layers in Ls (step 640) and thereby generate a covered and ordered image. The covered and ordered image is the basis for performing residual correction which identifies files not covered by the reused layers from Ls and adds layers to provide those files (step 650). The residue corrected image thereby generated is then the basis for a whiteout operation to remove unwanted files from the residue corrected image (step 660). The result is an output container image that includes a new manifest and the layers that provide the files that are not covered by the cached container layers at the client computing device (step 670). The output container image is transmitted to the client computing device (step 680) and the operation terminates.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, in a data processing system, for providing a container image to a client computing device, the computer-implemented method comprising:

receiving, from the client computing device, a pull request for the container image, wherein the pull request comprises a specification of the container image and an identification of each cached container layer of a plurality of cached container layers that are cached and stored locally in a local container layer store of the client computing device;

determining a set of cached container layers, among the plurality of cached container layers, that is reusable to provide the container image at the client computing device, wherein the determining of the set of cached container layers is based on the specification of the container image and the identification of each cached container layer of the plurality of cached container layers;

generating, based on the determining of the set of cached container layers, a set of reuse container layers;

generating, based on the generating of the set of reuse container layers, an output container image comprising container layers of the container image, wherein the output container image provides a first set of files not provided by the set of reuse container layers, and the output container image does not include a second set of files present in the set of reuse container layers; and transmitting the output container image to the client computing device.

2. The computer-implemented method of claim 1, wherein the container layers of the output container image are fewer than a total number of container layers of the container image.

3. The computer-implemented method of claim 1, wherein the container layers of the output container image are different from the set of reuse container layers of the container image, wherein the container layers comprise the first set of files not present in the set of reuse container layers.

4. The computer-implemented method of claim 1, wherein the generating of the output container image further comprises executing a layer ordering operation on the container layers of the output container image to order the container layers according to a hierarchical ordering of the container layers of the output container image.

5. The computer-implemented method of claim 4, wherein the layer ordering operation comprises a topology sorting algorithm applied to a graph representation of the container layers of the output container image.

6. The computer-implemented method of claim 1, wherein the generating of the output container image comprises executing a residual correction on container images of the output container image to add the container layers of the output container image from a container layer repository.

7. The computer-implemented method of claim 1, wherein the generating of the output container image comprises executing a whiteout of a third set of files of the first set of files in the output container image to remove the third set of files that are not included in the container image.

8. The computer-implemented method of claim 1, wherein the generating of the set of reuse container layers comprises:

determining a file universe, for the container image, comprising all files included in all container layers of the container image; and determining the second set of files of the plurality of cached container layers based on the file universe and a plurality of files included in the plurality of cached container layers to determine the first set of files that are not covered by the plurality of cached container layers, wherein the plurality of files of the plurality of cached container layers includes the second set of files.

9. The computer-implemented method of claim 8, wherein the determining of the second set of files comprises:

identifying a first cached container layer among the plurality of cached container layers having a maximum number of a third set of files in the file universe, wherein the second set of files of the plurality of cached container layers includes the third set of files;

adding the first cached container layer to the set of reuse container layers;

removing the third set of files associated with the first cached container layer from the file universe to generate an updated file universe; and repeating the identifying, the adding, and the removing based on the updated file universe until no further second cached container layer, among the plurality of cached container layers, that has associated a fourth set of files in the updated file universe is found, wherein the second set of files of the plurality of cached container layers includes the fourth set of files.

10. The computer-implemented method of claim 8, wherein the determining of the second set of files comprises:

determining, for each cached container layer of the plurality of cached container layers, a redundancy metric value and a contribution metric value, wherein the redundancy metric value of a first cached container layer of the plurality of cached container layers specifies a number of cached container layers, in the plurality of cached container layers, that contain a rarest file in the first cached container layer, and wherein the contribution metric value of the first cached container layer specifies a number of wanted files in the first cached container layer minus a number of unwanted files in the first cached container layer;

selecting the first cached container layer based on the redundancy metric value of the first cached container layer is smallest among the plurality of cached container layers, and the contribution metric value of the first cached container layer is largest among the plurality of cached container layers;

removing a third set of files, associated with the selected first cached container layer, from the file universe to generate an updated file universe, wherein the third set of files includes the rarest file and the wanted files, and the second set of files of the plurality of cached container layers includes the third set of files; and repeating the determining of the redundancy metric value and the contribution metric value, the selecting, and the removing based on the updated file universe until no further second cached container layer that has associated a fourth set of files in the updated file universe is selected, wherein the second set of files of the plurality of cached container layers includes the fourth set of files.

11. A computer program product comprising a computer readable storage medium having a computer readable program stored therein, wherein the computer readable program, when executed on a data processing system, causes the data processing system to:

receive, from a client computing device, a pull request for a container image, wherein the pull request comprises a specification of the container image and an identification of each cached container layer of a plurality of cached container layers that are cached and stored locally in a local container layer store of the client computing device;

determine, a set of cached container layers, among the plurality of cached container layers, that is reusable to provide the container image at the client computing device, wherein the determination of the set of cached container layers is based on the specification of the container image and the identification of each cached container layer of the plurality of cached container layers;

generating, based on the determination of the set of cached container layers, a set of reuse container layers;

generate, based on the generation of the set of reuse container layers, an output container image comprising container layers of the container image, wherein the output container image provides a first set of files not provided by the set of reuse container layers, and the output container image does not include a second set of files present in the set of reuse container layers; and transmit the output container image to the client computing device.

12. The computer program product of claim 11, wherein the container layers of the output container image are different from the set of reuse container layers of the container image, wherein the container layers comprise the first set of files not present in the set of reuse container layers.

13. The computer program product of claim 11, wherein the generation of the output container image further comprises executing a layer ordering operation on the container layers of the output container image to order the container layers according to a hierarchical ordering of the container layers of the output container image.

14. The computer program product of claim 13, wherein the layer ordering operation comprises a topology sorting algorithm applied to a graph representation of the container layers of the output container image.

15. The computer program product of claim 11, wherein the generation of the output container image comprises executing a residual correction on container images of the output container image to add the container layers of the output container image from a container layer repository.

16. The computer program product of claim 11, wherein the generation of the output container image comprises executing a whiteout of a third set of files of the first set of files in the output container image to remove the third set of files that are not included in the container image.

17. The computer program product of claim 11, wherein the generation of the set of reuse container layers comprises:

determining a file universe, for the container image, comprising all files included in all container layers of the container image; and determining the second set of files of the plurality of cached container layers based on the file universe and a plurality of files included in the plurality of cached container layers to determine the first set of files that are not covered by the plurality of cached container layers, wherein the plurality of files of the plurality of cached container layers includes the second set of files.

18. The computer program product of claim 17, wherein the determination of the second set of files comprises:

identifying a first cached container layer among the plurality of cached container layers having a maximum number a third set of files in the file universe, wherein the second set of files of the plurality of cached container layers includes the third set of files;

adding the first cached container layer to the set of reuse container layers;

removing the third set of files associated with the first cached container layer from the file universe to generate an updated file universe; and repeating the identifying, the adding, and the removing based on the updated file universe until no further second cached container layer, among the plurality of cached container layers, that has associated a fourth set of files in the updated file universe is found, wherein the second set of files of the plurality of cached container layers includes the fourth set of files.

19. The computer program product of claim 17, wherein the determination of the second set of files comprises:

determining, for each cached container layer of the plurality of cached container layers, a redundancy metric value and a contribution metric value, wherein the redundancy metric value of a first cached container layer of the plurality of cached container layers specifies a number of cached container layers, in the plurality of cached container layers, that contain a rarest file in the first cached container layer, and wherein the contribution metric value of the first cached container layer specifies a number of wanted files in the first cached container layer minus a number of unwanted files in the first cached container layer;

selecting the first cached container layer based on the redundancy metric value of the first cached container layer is smallest among the plurality of cached container layers, and the contribution metric value of the first cached container layer is largest among the plurality of cached container layers;

removing a third set of files, associated with the selected first cached container layer, from the file universe to generate an updated file universe, wherein the third set of files includes the rarest file and the wanted files, and the second set of files of the plurality of cached container layers includes the third set of files; and repeating the determining of the redundancy metric value and the contribution metric value, the selecting, and the removing based on the updated file universe until no further second cached container layer that has associated a fourth set of files in the updated file universe is selected, wherein the second set of files of the plurality of cached container layers includes the fourth set of files.

20. An apparatus comprising:

at least one processor; and at least one memory coupled to the at least one processor, wherein the at least one memory comprises instructions which, when executed by the at least one processor, cause the at least one processor to:

receive, from a client computing device, a pull request for a container image, wherein the pull request comprises a specification container image and an identification of each cached container layer of a plurality of cached container layers that are cached and stored locally in a local container layer store of the client computing device;

determine a set of cached container layers, among the plurality of cached container layers, that is reusable to provide the container image at the client computing device, wherein the determination of the set of cached container layers is based on the specification container image and the identification of each cached container layer of the plurality of cached container layers;

generating, based on the determination of the set of cached container layers, a set of reuse container layers;

generate, based on the generation of the set of reuse container layers, an output container image comprising container layers of the container image, wherein the output container image provides a first set of files not provided by the set of reuse container layers, and the output container image does not include a second set of files present in the set of reuse container layers; and transmit the output container image to the client computing device.

* * * * *